(12) United States Patent
Rouviere et al.

(10) Patent No.: US 11,394,195 B2
(45) Date of Patent: Jul. 19, 2022

(54) OVERVOLTAGE PROTECTION

(71) Applicants: STMicroelectronics (Tours) SAS, Tours (FR); STMicroelectronics, Inc., Coppell, TX (US)

(72) Inventors: Mathieu Rouviere, Tours (FR); Jeffrey Blauser, Jr., Round Rock, TX (US); Karl Grange, Tours (FR); Mohamed Saadna, Saint Cyr-sur-Loire (FR)

(73) Assignees: STMicroelectronics (Tours) SAS, Tours (FR); STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 17/118,028

(22) Filed: Dec. 10, 2020

(65) Prior Publication Data
US 2021/0184490 A1 Jun. 17, 2021

(30) Foreign Application Priority Data
Dec. 13, 2019 (FR) ...................................... 1914398

(51) Int. Cl.
*H02H 3/20* (2006.01)
*G06F 1/26* (2006.01)
(Continued)

(52) U.S. Cl.
CPC ............ *H02H 3/202* (2013.01); *G06F 1/266* (2013.01); *G06F 1/28* (2013.01); *G06F 1/30* (2013.01); *G06F 11/3058* (2013.01); *H02H 3/20* (2013.01); *G06F 1/3253* (2013.01); *G06F 13/4282* (2013.01); *G06F 2213/0042* (2013.01); *H02J 7/342* (2020.01)

(58) Field of Classification Search
CPC ... G06F 1/266; G06F 1/28; G06F 1/30; G06F 1/305; G06F 1/3253; G06F 11/3058; G06F 11/3062; G06F 13/4282; G06F 2213/0042; H02J 7/342; H02J 7/0063; H02J 7/00308; H02J 2207/30; H02H 3/20; H02H 3/202; H02H 3/006
See application file for complete search history.

(56) References Cited

U.S. PATENT DOCUMENTS 5,610,495 A * 3/1997 Yee ........................ H01M 10/48
320/116
5,818,201 A * 10/1998 Stockstad ............... H02J 7/008
320/119
(Continued)

OTHER PUBLICATIONS

INPI Search Report and Written Opinion for FR 1914398 dated Oct. 26, 2020 (9 pages).

*Primary Examiner* — Thomas J. Cleary
(74) *Attorney, Agent, or Firm* — Crowe & Dunlevy

(57) ABSTRACT

A power supply interface includes a first switch that couples an input terminal to an output terminal. A voltage dividing bridge is coupled to receive a supply potential. A comparator has a first input connected to a first node of the bridge and a second input configured to receive a constant potential. A digital-to-analog converter generates a control voltage that is selectively coupled by a second switch to a second node of the bridge. A circuit control controls actuation of the second switch based on operating mode and generates a digital value input to the converter based on a negotiated set point of the supply potential applied to the input terminal.

19 Claims, 3 Drawing Sheets

(51) Int. Cl.
  *G06F 11/30* (2006.01)
  *G06F 1/28* (2006.01)
  *G06F 1/30* (2006.01)
  *H02J 7/34* (2006.01)
  *G06F 1/3234* (2019.01)
  *G06F 13/42* (2006.01)

(56) References Cited

U.S. PATENT DOCUMENTS

| | | | |
|---|---|---|---|
| 5,986,902 A * | 11/1999 | Brkovic | H02M 3/1588 363/50 |
| 2003/0122530 A1* | 7/2003 | Hikita | G05F 1/573 323/285 |
| 2008/0258688 A1 | 10/2008 | Hussain et al. | |
| 2010/0164528 A1* | 7/2010 | Rahman | G01R 35/005 324/762.01 |
| 2014/0146426 A1 | 5/2014 | Murakami | |
| 2014/0198535 A1* | 7/2014 | Yang | H02M 3/33523 363/16 |
| 2014/0211351 A1 | 7/2014 | Shoykhet et al. | |
| 2016/0190794 A1* | 6/2016 | Forghani-Zadeh | H02H 9/048 361/86 |
| 2017/0331270 A1* | 11/2017 | Mattos | G01R 19/165 |
| 2018/0335454 A1 | 11/2018 | Marsha et al. | |
| 2018/0335818 A1* | 11/2018 | Mattos | G06F 1/266 |
| 2019/0319446 A1* | 10/2019 | Mondal | H01R 24/62 |
| 2019/0319447 A1* | 10/2019 | Mukhopadhyay | H03K 5/24 |
| 2020/0067304 A1* | 2/2020 | Kim | H01R 13/713 |
| 2020/0212860 A1* | 7/2020 | Delshadpour | H03K 17/22 |
| 2021/0119435 A1* | 4/2021 | Jain | H02H 1/0007 |
| 2021/0165050 A1* | 6/2021 | Gupta | G05B 17/02 |
| 2021/0263579 A1* | 8/2021 | Camiolo | H02J 1/082 |

* cited by examiner

OVERVOLTAGE PROTECTION

PRIORITY CLAIM

This application claims the priority benefit of French Application for Patent No. 1914398, filed on Dec. 13, 2019, the content of which is hereby incorporated by reference in its entirety to the maximum extent allowable by law.

TECHNICAL FIELD

The present disclosure generally concerns devices for delivering a supply power from a power source to a load. The application more particularly concerns a power supply interface connected between a load to be powered and a USB-C connector, the connector being configured to be electrically coupled to a power source, particularly by a USB-C-type cable.

BACKGROUND

Although, currently, wireless connection is one of the main research axes in the field of power and data exchange, cables still seem to be the most reliable way to connect a plurality of electronic devices, be it to exchange data or to power or charge one or a plurality of electronic devices.

Among the different types of cables and connectors of the USB standard, the USB-C type is one of the types which enables the exchange of data and power. The USB-PD or USB "Power Delivery" technology is a technology which adapts on USB-C-type cables and connectors. Such a technology enables to manage the powering of electronic devices.

It would be desirable to at least partly improve certain aspects of devices for delivering, from a power source, a supply power to a load via connectors and, if need be, a cable, particularly via USB-C connectors adapted to the USB-PD technology and, if need be, a USB-C cable adapted to the USB-PD technology.

In particular, it would be desirable to be able to improve at least certain aspects of a power supply interface connected between a load to be powered and a connector, for example, of USB-C type, the connector being configured to be electrically coupled to a power source, for example, by a USB-C cable.

There is a need to overcome all or part of the disadvantages of known devices for delivering, from a power source, a supply power to a load. In particular, there is a need to overcome all or part of the disadvantages of known power supply interfaces connected between a load to be powered and a connector, for example, of USB-C type, the connector being configured to be electrically coupled to a power source, for example, by a USB-C-type cable.

SUMMARY

An embodiment provides a power supply interface comprising: a first switch coupling an input terminal of the interface to an output terminal of the interface; a voltage dividing bridge coupling the input terminal to a reference node configured to receive a reference potential; a comparator having a first input connected to a first node of the dividing bridge and having a second input configured to receive a constant potential; a digital-to-analog converter; a second switch coupling an output of the converter to a second node of the dividing bridge; and a first circuit configured to control the second switch and the converter, wherein a control of the first switch is determined by an output signal of the comparator.

According to an embodiment, the dividing bridge comprises at least a first resistor coupling the input terminal to the first node, at least one second resistor coupling the first node to the second node, and at least one third resistor coupling the second node to the reference node.

According to an embodiment, the input terminal is configured to receive a first potential, the output terminal being configured to receive a second potential.

According to an embodiment, the interface is configured to receive the first potential of a power source and of delivering the second potential to a load.

According to an embodiment, the first circuit is further configured to negotiate a set point value of the first potential and to control the converter according to the negotiated set point value.

According to an embodiment, the first circuit is configured to control a turning on of the second switch after the negotiation of said set point value.

According to an embodiment, the interface further comprises a second circuit configured to deliver a signal for controlling the first switch from the output signal of the converter.

According to an embodiment, the interface further comprises a third circuit having a first terminal coupled to the input terminal by the first switch and having a second terminal coupled to the output terminal, the third circuit being configured to deliver, to the second terminal, a potential of the first terminal in a first operating mode or a third potential in a second operating mode.

According to an embodiment, the first circuit is configured to select an operating mode among the first and second operating modes.

According to an embodiment, the third circuit comprises a power converter configured to deliver the third potential from the potential of the first terminal.

According to an embodiment, the first switch is a MOS transistor.

According to an embodiment, the second switch is configured to be off in the absence of a control of the first circuit.

According to an embodiment, the second switch is a MOS transistor, preferably normally off.

According to an embodiment, the first circuit comprises, preferably is formed by, a microcontroller.

A further embodiment provides a method of powering a load from a power source comprising the steps of: receiving a first potential of the source; detecting with a comparator that the first potential is lower than a threshold and conditioning a turning on of a first switch coupling the source to the load to said detection; and negotiating, with the source, a set point value of the first potential, wherein the threshold is fixed in a first operating mode, and is determined by the negotiated set point value in a second operating mode, the method being preferably implemented by a power supply interface.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
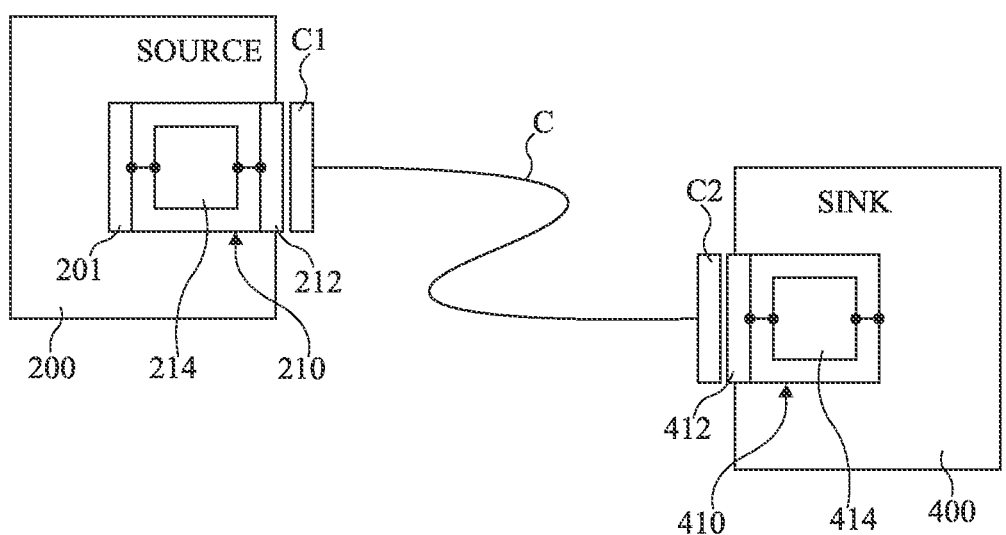
FIG. 1 is a simplified diagram illustrating a connection between an electronic device comprising a power source and an electronic device comprising a load to be powered.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the management of a phase of negotiation relative to the supply power to be delivered to a load from a power source is not detailed. Further, only the relevant aspects of the USB-C and USB-PD technologies are described, the other aspects adapting with no modifications. In particular, the function of data exchange via connectors, and possibly a USB-C-type cable, preferably adapted to the USB-PD technology, is not described, the described embodiments being compatible with the usual data exchange function of the USB-C and USB-PD technologies.

Throughout the present disclosure, the term "connected" is used to designate a direct electrical connection between circuit elements, whereas the term "coupled" is used to designate an electrical connection between circuit elements that may be direct, or may be via one or more other elements.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings.

The terms "about", "approximately", "substantially", and "in the order of" are used herein to designate a tolerance of plus or minus 10%, preferably of plus or minus 5%, of the value in question.

FIG. 1 is a simplified view illustrating a power transmission between an electronic device 200 playing the role of a power source (SOURCE) and an electric device to be powered 400 playing the role of a load or sink (SINK). In this example, devices 200 and 400 are connected via a USB-C-type cable C, in the present example adapted to the USB-PD technology. In another example, not shown, devices 200 and 400 are directly connected to each other, with no intervening cable C.

Device 200 comprises an electric power source 201. Power source 201 is, for example, a DC power supply, for example, obtained from an AC power source such as the mains. In the following description, it is considered that device 200 comprises a DC power source 201, device 200 being, for example, a computer, a portable battery, etc., or any other electronic device capable of powering a device and/or of charging a battery.

Cable C comprises, at each of its ends, a USB-C-type connector C1, C2, in the present example adapted to the USB-PD technology. Connectors C1, C2 are generally identical.

A connection element 210, respectively 410, comprising a connection interface 214, respectively 414, and a connector 212, respectively 412, is arranged on the side of device 200, respectively of device 400. Interface 214, respectively 414, couples source 201, respectively the load to be powered (not illustrated) of device 400, to connector 212, respectively 412. Preferably, it is considered that connection elements 210, respectively 410, form part of device 200, respectively 400. Each connector 212, 412 is configured to cooperate with a connector C1, C2 of cable C. Interfaces 214, 414 are generally identical. Connection interfaces 214, 414 enable to adapt the power supplied by power source 201 according to the power required by the load of device 400. More particularly, in the following description, connection interfaces 214, 414 enable to adapt the power supplied by power source 201 according to a supply power set point required by the device 400, particularly in the case where the USB-PD technology is implemented. In particular, interface 214 on the side of power source 201 generally comprises a power converter (not shown) configured to deliver, from the supply power delivered by source 201, the supply power that device 200 delivers to device 400. Similarly, the interface 414 on the side of the load to be powered generally comprises a power converter (not shown), for example, configured to generate, from the supply power received by device 400, a supply power which is effectively delivered to the load to be powered of device 400.

During a connection managed by the USB-PD technology, an initial supply power, generally having a predefined value, for example, equal to 2.5 W, is delivered by the interface 214 of device 200 to the interface 414 of device 400. Once interface 414 is powered by the initial supply power, a communication is established between devices 200 and 400, via their interfaces 214 and 414, to decide on the electric supply power necessary for device 400 to be powered and/or charged. For example, device 400 indicates, via its interface 414, the minimum power required for its operation and device 200 indicates, via its interface 214, the supply powers that it is capable of delivering. A negotiation, in the present example managed by the USB-PD technology, then starts in order to define what power device 200 will deliver to device 400. Once the negotiation is over, connection interface 214 adapts the supply power of power source 201 according to the result of the negotiation, after which the power supply of device 400 starts.

As an example, the negotiated supply power is selected from a list of predefined supply powers (i.e., power levels). The list is, for example, recorded in interface 214. Preferably, the list is defined by a standard. Each predefined supply power is characterized by a plurality of values, particularly by a predefined value of the voltage and, possibly, by a predefined minimum value of the current corresponding to the predefined power. In the USB-PD technology, each set of values characterizing a predefined supply power in the list corresponds to a set of data designated with acronym PDO ("Power Data Object"). The PDO sets of data may be transmitted between devices 200 and 400 adapted to the USB-PD technology to define, during a negotiation, which of the predefined powers should be delivered by device 200 to load 400. In the present example, the negotiated supply power received by interface 414 of device 400 may be non-adapted to the load to be powered of device 400, and the power converter of interface 414 may then be used to deliver a supply power adapted to the load of device 400, from the negotiated supply power received by device 400.

As an example, once a supply power has been negotiated, the power supply voltage delivered by device 200 to interface 414 of device 400 may be controlled by the load of device 400 to correspond to a power supply voltage required by a load of device 400, typically a battery to be charged. Such an operating mode is called programmable power supply (PPS) mode. In this case, interface 414 is, according to an embodiment, configured to directly deliver to the load of device 400 the supply power that it receives from device 200, and in particular the power supply voltage that it receives from device 200.

When devices 200 and 400 are connected and device 200 delivers a supply power to device 400, it is desirable for the supply voltage which is delivered to interface 414 by device 200 to exhibit no overvoltage. Indeed, such overvoltages are capable of causing malfunctions of device 400, or even to damage device 400, particularly its interface 414 or its load to be powered. In particular, when the load to be powered is a battery to be charged and the system operates in PPS mode, the possible overvoltages on the power supply voltage received by interface 414 are directly transmitted to the load to be powered of device 400, which may cause malfunctions, or even a destruction, of the load of device 400.

The power supply interface 414 operates in a manner where, during a connection between devices 200 and 400, as long as device 400 receives a predefined initial supply power, or, in other words, as long as a supply power has not been negotiated, the power supply voltage received by interface 414 is compared with a predefined fixed threshold to detect an overvoltage. Further, once a supply power set point, and more particularly a power supply voltage set point, has been negotiated, the interface is configured to compare the received power supply voltage with a threshold determined by the negotiated power supply voltage set point, to detect an overvoltage. The interface 414 more particularly operates in a manner where same elements and/or circuits and/or components of interface 414 are used to compare the received power supply voltage with the fixed threshold in a first operating phase, and with the variable threshold determined by a negotiated voltage set point in a second operating phase.

Figure 2:
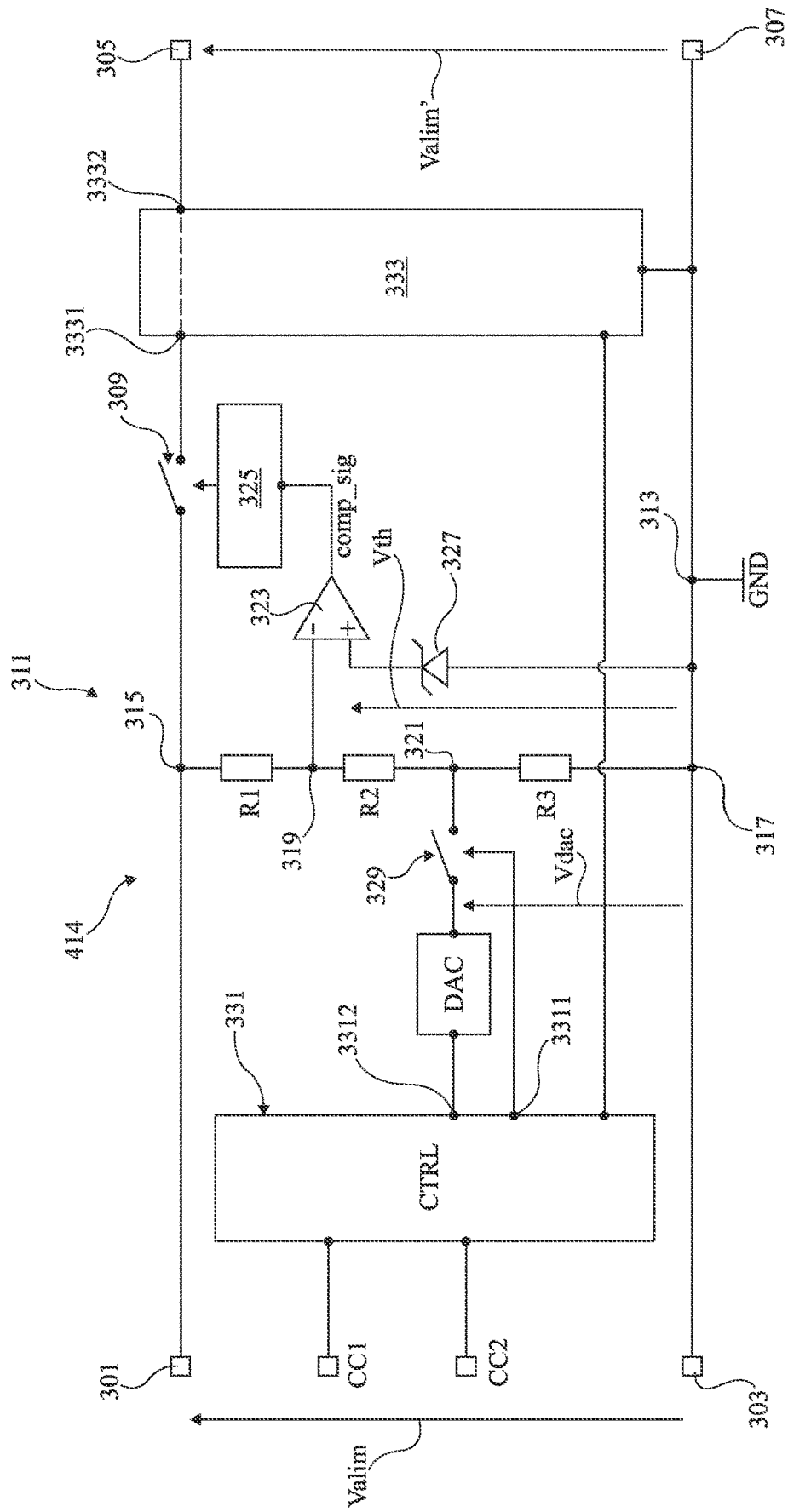
FIG. 2 shows in more detailed fashion an embodiment of a portion of the electronic device of FIG. 1 which comprises the load to be powered.

FIG. 2 shows in further detail an embodiment of interface 414 of device 400 of FIG. 1. Preferably, interface 414 is of USB-C type, for example, adapted to the USB-PD technology, and interface 214 may be identical to interface 414.

Interface 414 comprises two input terminals 301 and 303. Terminal 301 is configured to receive a DC power supply potential, for example, positive, terminal 303 being configured to receive a reference potential, for example, a ground potential GND. In other words, interface 414 is configured to receive a DC power supply voltage Valim, for example, positive, between terminals 301 and 303.

Interface 414 comprises two output terminals 305 and 307. Terminal 305 is configured to deliver a DC power supply potential Valim' to a load of device 400, terminal 307 delivering reference potential GND and being for example connected to terminal 303. In other words, interface 414 is configured to deliver, based on voltage Valim, a DC power supply voltage Valim', for example, positive, between terminals 305 and 307.

Interface 414 further comprises, on the side of its input terminals 301 and 303, at least one communication terminal. Input terminals 301 and 303 and the communication terminal are all configured to be coupled to the corresponding connector 412 (not shown), which then allows the coupling with device 200, for example, via connector C2, cable C if need be, and connector C1 as shown in FIG. 1.

According to an embodiment, interface 414 comprises two communication terminals CC1, CC2 as shown in FIG. 2. An advantage of having two communication terminals is that, in the case where the terminals are symmetrically positioned on connector 412, this enables to form a reversible connector C2, that is, a connector C2, for example rectangular, that can be coupled to connector 412 in a first direction and in a second reverse direction.

Interface 414 comprises a switch 309, for example, a MOS ("Metal Oxide Semiconductor") transistor, for example, an N-channel MOS transistor. Preferably, switch 309 is configured to be, by default, that is, in the absence of a control, in the off state, switch 309 being then, for example, implemented by means of a normally-off MOS transistor.

Switch 309 couples input terminal 301 to output terminal 305. For example, a first conduction terminal of switch 309 is coupled, preferably connected, to terminal 301, a second conduction terminal of switch 309 being coupled to terminal 305. Conduction terminal of a switch here means one of the two terminals of a switch between which a current flows when the switch is on and between which the switch behaves as an open circuit when the switch is off.

Interface 414 further comprises a resistive dividing bridge 311. Dividing bridge 311 couples terminal 301 to terminal 303. In other words, dividing bridge 311 couples input terminal 301 to a node 313 configured to receive reference potential GND, node 313 being coupled, preferably connected, to terminal 303. For example, dividing bridge 311 comprises an end 315 coupled, preferably connected, to terminal 301, and another end 317 coupled, preferably connected, to node 313.

Dividing bridge 311 comprises two (tap or intermediate) nodes 319 and 321.

According to an embodiment, dividing bridge 311 comprises at least one resistor R1 coupling end 315 of bridge 311 to node 319, at least one resistor R2 coupling node 319 to node 321, and at least one resistor R3 coupling node 321 to end 317 of bridge 311. As an example, dividing bridge 311 comprises a resistor R1 having a terminal coupled, preferably connected, to end 315 of bridge 311 and having its other terminal coupled, preferably connected, to node 319, a resistor R2 having a terminal coupled, preferably connected, to node 319 and having its other terminal coupled, preferably connected, to node 321, and a resistor R3 having a terminal coupled, preferably connected, to node 321 and having its other terminal coupled, preferably connected, to end 317 of bridge 311.

Interface 414 comprises a comparator 323. Switch 309 is controlled from an output signal comp sig of comparator 323.

According to an embodiment, interface 414 comprises a driver circuit 325 configured to deliver, from signal comp_sig, a control signal corresponding to a control terminal of switch 309, for example, a gate of a MOS transistor implementing switch 309.

A first input of comparator 323, in the present example, the inverting input (−) of comparator 323, is connected to the node 319 of dividing bridge 311. The first input of comparator 323 is configured to receive the potential of node 319 of dividing bridge 311. A second input of comparator 323, in the present example, the non-inverting input (+), is configured to receive a constant or fixed potential Vth, for example, referenced to ground GND.

According to an embodiment, interface 414 comprises a diode 327, for example, a Zener diode, preferably a bandgap Zener diode, coupling the second input of comparator 323 to node 313. Diode 327 is configured to deliver constant potential Vth to the second input of comparator 323, potential Vth being preferably constant despite possible temperature variations in interface 414. As an example, diode 327 has a first electrode, preferably is anode, coupled, preferably connected, to node 313, and a second electrode, preferably its cathode, coupled, preferably connected, to the second input of comparator 323. As a variation, potential Vth is delivered to the second input of comparator 323 by a circuit other than a diode 327.

Interface 414 comprises a digital-to-analog converter DAC and a switch 329, preferably a switch 329 configured to be, by default, in the off state. Switch 329 couples an output of the DAC converter to node 321 of dividing bridge 311. For example, a conduction terminal of switch 329 is coupled, preferably connected, to the output of the DAC converter, another conduction terminal of switch 329 being coupled, preferably connected, to node 321. Thus, when switch 329 is on, the potential of node 321 is imposed by a potential Vdac available on the output of the DAC converter and, when switch 329 is off, the potential of node 321 is imposed by the value of potential Valim on terminal 301 and the values of resistors R1, R2, and R3 of dividing bridge 311.

According to an embodiment, switch 329 is a MOS transistor, for example, with an N channel, preferably a normally-off MOS transistor.

Interface 414 comprises a circuit 331 (block "CTRL") configured to control switch 329. Control circuit 331 comprises an output 3311 coupled, preferably connected, to a control terminal of switch 329, for example, a gate of a transistor implementing switch 329.

Control circuit 331 is further configured to control the DAC converter, that is, to deliver a digital control signal, for example, over a plurality of bits, to an input of the DAC converter, the value of the digital control signal determining the value of the analog potential Vdac delivered by the output of the DAC converter. In the shown example, the DAC converter is external to circuit 331, and circuit 331 comprises an output 3312 configured to deliver a digital signal as the DAC converter control signal, output 3312 being coupled, preferably connected, to the input of the DAC converter. In another example, not shown, the DAC converter forms part of circuit 331.

According to an embodiment, circuit 331 comprises or is formed by a microcontroller. Preferably, the DAC converter then is an internal component of the microcontroller.

According to an embodiment, circuit 331 is configured to implement various functions of interface 414.

More particularly, according to an embodiment, circuit 331 is configured to implement the functions of data exchange with device 200 (FIG. 1), and comprises, in the present example, two terminals respectively coupled to the two terminals CC1 and CC2.

Further, according to an embodiment, circuit 331 is configured to implement, for example, jointly with interface 214 of device 200 (FIG. 1), the phase of negotiation of a supply power set point that device 200 will deliver to device 400.

Preferably, interface 414 comprises a circuit 333 coupling switch 309 to terminal 305 of interface 414. For example, circuit 333 comprises a first terminal 3331 coupled, preferably connected, to switch 309, and more particularly to the conduction terminal of switch 309 which is on the side of terminal 305 of interface 414, circuit 333 comprising a second terminal 3332 coupled, preferably connected, to terminal 305.

Circuit 333 is configured to receive, for example, on its terminal 3331, a first potential, for example, potential Valim, and to deliver, for example, on its terminal 3332, a second potential, for example, potential Valim'. Circuit 333 is, for example, coupled, preferably connected, to reference node 313.

According to an embodiment, in a first operating mode when power supply voltage Valim is equal to the power supply voltage negotiated between devices 200 and 400 (FIG. 1) but has a value which is not adapted to the load of device 400, circuit 333 is configured to adapt the value of the second potential Valim' to the load. For this purpose, circuit 333, for example, comprises a power converter (not shown). This first operating mode is, for example, implemented when the negotiated supply power is selected from the predefined list of supply powers and the negotiated supply power corresponds to a set point value of potential Valim which is not adapted to the load of device 400. In a second operating mode, for example, the PPS mode, circuit 333 is configured to deliver the second potential at a value equal to that of the first potential that it receives, for example by connecting its terminal 3331 to its terminal 3332 as illustrated in dotted lines in FIG. 2.

As an example, circuit 331 is configured to control circuit 333, for example, to supply circuit 333 with a signal controlling the selection of the operating mode of circuit 333 from among the first and second above-described operating modes.

Interface 414 operates as follows.

During a connection of device 200 to device 400, via connectors 212 and C1, if need be cable C, and connectors C2 and 412 (FIG. 1), device 200 delivers an initial supply power, for example, a voltage Valim having an initial value equal to 5.5 V, for example, for an initial supply power equal to 2.5 W.

Switches 309 and 329 are off by default. Thus, even if potential Valim has a value distant from the initial value that it should have, the initial power received by device 400 (FIG. 1) is not transmitted to its load.

The received potential Valim is compared with a fixed (constant) high threshold, for example, equal to 5.9 V. The fixed threshold is determined by the value of potential Vth and of the resistors of dividing bridge 311. Indeed, the potential of node 319 is then representative of the value of potential Valim, and comparator 323 then compares the potential of node 319 to potential Vth. More particularly, in the present example, the potential of node 319 is equal to (Valim*(R2+R3))/(R1+R2+R3) and is compared with the fixed potential Vth. In other words, potential Valim is compared with a threshold equal to ((R1+R2+R3)*Vth)/(R2+R3).

If potential Valim is smaller than this high threshold, this means that potential Valim has no overvoltage and switch 309 is switched to the on state. For example, switch 309 and, when present, circuit 325, are configured so that the switch is on, respectively off, when signal comp sig is in a first binary state, for example, the high state, respectively in a second binary state, for example, the low state. Comparator 323 is then configured so that signal comp sig is in the first binary state, respectively the second binary state, when potential Valim is smaller than the high threshold, respectively greater than the high threshold, that is, in the present example, when the potential of node 319 is smaller, respectively greater, than fixed potential Vth.

The turning on of switch 309 results in that terminal 301 is then coupled to terminal 305, preferably via circuit 333.

Once switch 309 is on, the interface implements a phase of negotiation of a supply power set point, and thus of a set point value of potential Valim. As an example, the reception by interface 414 of the initial supply power enables to power circuit 331, which then implements the negotiation phase.

Further, from the time when switch 309 is switched to the on state, any overvoltage on potential Valim resulting in potential Valim exceeding the high fixed threshold is detected by a switching of signal comp sig, which causes the turning off of switch 309. This enables to protect from the overvoltage the components of device 400 (FIG. 1) connected to terminals 305 and 307 of interface 414.

Once the supply power negotiation is finished between devices 200 and 400 or, in other words, once a set point value of potential Valim has been determined by devices 200 and 4000, device 200 adapts the value of potential Valim to the negotiated set point value.

Further, the high threshold with which potential Valim is compared to detect a possible overvoltage is updated, the value of the high threshold being then determined by the set point value of potential Valim. Indeed, the negotiated set point value of potential Valim may be greater than that of the fixed threshold having potential Valim compared therewith during the first operating phase when interface 414 receives the initial supply power and negotiates a supply power. As a result, in the absence of a modification of the high threshold in accordance with the negotiated set point value of potential Valim, signal comp sig would then switch to the binary state indicating that potential Valim is greater than the fixed high threshold, which would cause the turning off of switch 309 and would stop the power supply of the load of device 400.

The update of the high threshold is implemented by turning on switch 329, whereby potential Vdac is forced, or applied, onto node 321 of dividing bridge 311, the value of potential Vdac being determined by the negotiated set point value of potential Valim. As a result, the potential of node 319 received by the first input of comparator 323 is then equal to ((Valim−Vdac)*R2)/(R1+R2)+Vdac. In other words, the high threshold having potential Valim compared therewith is then equal to ((Vth*(R1+R2)−R1*Vdac)/R2 and is effectively determined by the value of potential Vdac or, in other words, variable according to the value of potential Vdac. The value of potential Vdac is determined by the digital control signal received by the input of the DAC converter or, in other words, is determined by circuit 331, the value of the digital DAC converter control signal being determined by circuit 331 based on the negotiated set point value of potential Valim.

In particular, for a given negotiated set point value of potential Valim, potential Vdac is selected so that potential Valim is smaller than the variable high threshold when its value is equal to the negotiated set point value, and is greater than the variable high threshold when potential Valim has an overvoltage. It should be noted that, for a given set point value of potential Valim, the selection of the value of potential Vdac, and thus of the amplitude of an increase in the value of potential Valim with respect to its set point value from which it is considered that an overvoltage is present on potential Valim, is within the abilities of those skilled in the art according, for example, to the load to be powered of device 400 and/or to the application or the device where interface 414 is implemented.

Thus, once a set point value of potential Valim has been negotiated, potential Valim is compared with a variable high threshold to detect an overvoltage on potential Valim and to control a turning off of switch 309 when such an overvoltage is detected.

Further, each update of the set point value of potential Valim causes a corresponding update to the value of the high threshold having potential Valim compared therewith.

As an example, the update of the set point value of potential Valim results from the implementation of a new phase of negotiation of a supply power.

As another example, while a supply power has been negotiated, when interface 414, and more generally devices 200 and 400 (FIG. 1), operate in PPS mode, the set point value of potential Valim is periodically or continuously updated, for example, according to a measured value of the current flowing through terminals 301 and 305 and to the set point value of the negotiated supply power. This enables to keep a set point value of potential Valim adapted to the load of device 400.

In the operation of above-described interface 414, the threshold having potential Valim compared therewith is fixed (constant) in a first operating phase, for example starting at the connection of devices 200 and 400 therebetween and for example ending at the end of a first step of negotiation of a supply power, and is variable in a second operating phase, for example starting at the end of the first negotiation phase.

In an alternative embodiment, although this is not shown herein, the turning on of switch 309 may further be conditioned by the result of a comparison of potential Valim with a low threshold. In this case, switch 309 is only in the on state if potential Valim is between the high and low thresholds, and is maintained in the off state otherwise. The low threshold may be fixed in the first and second operating phases of interface 414, or may be fixed in the first operating phase and variable according to the set point value of potential Valim in the second operating phase of the interface. In the case where the low threshold is fixed in the first operating phase of interface 414, and variable in the second operating phase of interface 414, the implementation of the low threshold and of the comparison of potential Valim with the low threshold may be implemented similarly to the previously described implementation respectively of the high threshold and of the comparison of potential Valim with the high threshold.

Figure 3:
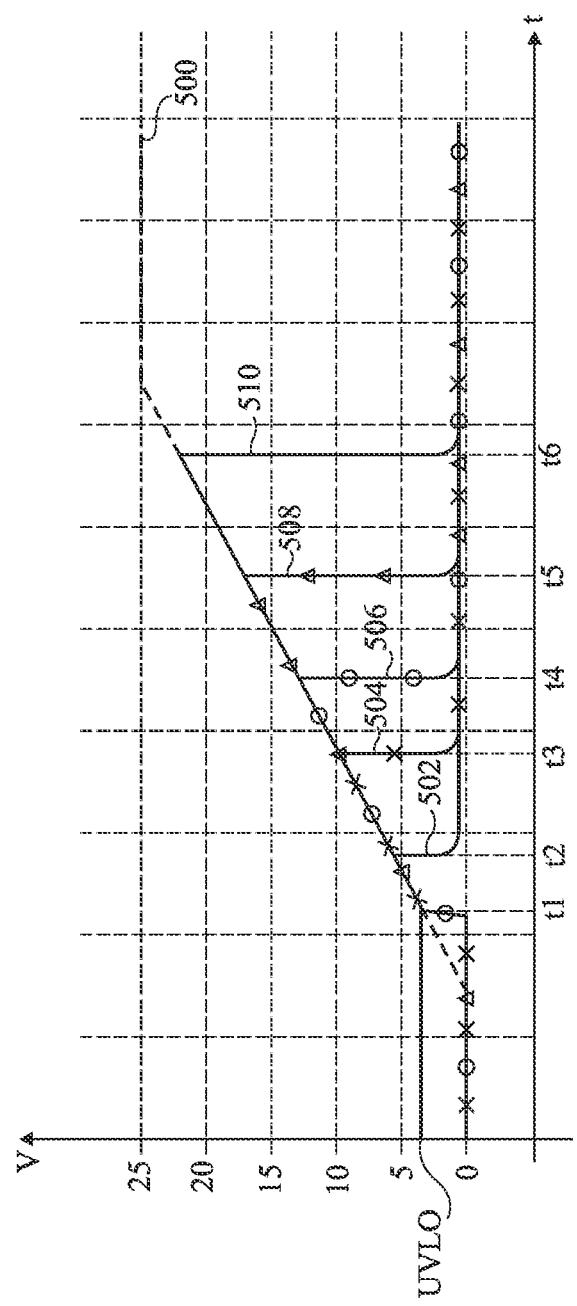
FIG. 3 illustrates with curves the operation of the portion of the electronic device of FIG. 2, according to an example of an implementation mode.

FIG. 3 illustrates in curves 500, 502, 504, 506, 508, 510 the operation of interface 414 according to an embodiment.

More particularly, in this example of implementation, resistor R1 has a value equal to 100 kΩ, resistor R2 has a value equal to 6.2 kΩ, resistor R3 has a value equal to 21 kΩ, and potential Vth is equal to 1.27 V. Further, in the present example, it is considered that the initial supply power corresponds to an initial value of potential Valim equal to 5.5 V. Further, in the present example, interface 414 implements a comparison of potential Valim with a low threshold UVLO, here equal to 3.5 V.

Curve 500 corresponds to a ramp of increasing potential Valim delivered to terminal 301. Curve 502 illustrates the corresponding shape of the potential delivered to terminal 3331 of circuit 333 in the case where switch 329 and the DAC converter would be omitted, or, said otherwise, the case where the switch would be always open. Curves 504, 506, 508, and 510 illustrating the corresponding shapes of the potential delivered to terminal 3331 of circuit 333 when potential Vdac is equal respectively to 0.71 V, 0.52 V, 0.30 V, and 0 V. In other words, curve 502 illustrates the case where potential Valim is compared with a high threshold having a fixed value equal to 5.9 V, curves 504, 506, 508, and 510 illustrating the cases where potential Valim is compared with a high threshold of variable value equal to respectively 10.3 V, 13.4 V, 17 V and 21.5 V.

In FIG. 3, as long as potential Valim (curve 500) is not greater than low threshold UVLO (time t1), switch 309 is off and potential Valim is not transmitted to terminal 3331 of circuit 333, the potential of this terminal then being zero (curves 502, 504, 506, 508, and 510). From time t1, switch 309 turns on and the potential on terminal 3331 of circuit 333 (curves 502, 504, 506, 508, and 510) then follow potential Valim.

At a time t2 subsequent to time t1, potential Valim becomes greater than 5.9 V, whereby, for the case of curve 502 (static threshold), switch 309 turns off and the potential supplied to terminal 3331 of circuit 333 switches to a zero value. After time t2, potential Valim is greater than 5.9 V, whereby, for the case of curve 502, switch 309 remains off and the potential on terminal 3331 remains at a zero value.

For curves 504, 506, 508 and 510, the switch 329 is switched to the on state between time t2 and time t3, whereby the potential Valim is then compared to a dynamic threshold, the value of which being determined by the potential Vdac, based on the negotiated set point value of potential Valim.

At a time t3 subsequent to time t2, potential Valim becomes greater than 10.3 V, whereby, for the case of curve 504, switch 309 turns off and the potential delivered to terminal 3331 of circuit 333 switches to a zero value. After time t3, potential Valim is greater than 10.3 V, whereby, for the case of curve 504, switch 309 remains off and the potential on terminal 3331 remains at a zero value.

At a time t4 subsequent to time t3, potential Valim becomes greater than 13.4 V, whereby, for the case of curve 506, switch 309 turns off and the potential delivered to terminal 3331 of circuit 333 switches to a zero value. After time t4, potential Valim is greater than 13.4 V, whereby, for the case of curve 506, switch 309 remains off and the potential on terminal 3331 remains at a zero value.

At a time t5 subsequent to time t4, potential Valim becomes greater than 15.8 V, whereby, for the case of curve 508, switch 309 turns off and the potential supplied to terminal 3331 of circuit 333 switches to a zero value. After time t5, potential Valim is greater than 15.8 V, whereby, for the case of curve 508, switch 309 remains off and the potential on terminal 3331 remains at a zero value.

At a time t6 subsequent to time t5, potential Valim becomes greater than 21.5 V, whereby, for the case of curve 510, switch 309 turns off and the potential supplied to terminal 3331 of circuit 333 switches to a zero value. After time t6, potential Valim is greater than 21.5 V, whereby, for the case of curve 510, switch 309 remains off and the potential on terminal 3331 remains at a zero value.

Thus, it can be observed in FIG. 3 that switch 309 is effectively switched to the off state as soon as potential Valim becomes greater than the high threshold, be it fixed or variable with a value determined by the negotiated set point value of potential Valim. The turning off of switch 309 enables to avoid for a potential Valim exhibiting an overvoltage to be transmitted to circuit 333 and, more generally, to a load of device 400 (FIG. 1) which could be damaged, or even destroyed, by such an overvoltage.

It could have been devised to implement the comparison of potential Valim with a threshold of variable value determined by a negotiated set point value of potential Valim by using the microcontroller of circuit 331 and an analog-to-digital converter delivering a binary digital signal representative of a value of potential Valim. This would however require for the analog-to-digital converter to periodically provide a digital signal representative of potential Valim and for the microcontroller to compare, for each period, the output signal of the analog-to-digital with a threshold. This would have caused a higher consumption of the resources of the microcontroller of circuit 331 with respect to the described embodiment, and such a resource consumption would have been all the higher as the period of provision of the digital signal representative of potential Valim is short.

It could have been devised to connect switch 329 to the input of comparator 323 which is not connected to node 319 of dividing bridge 311, and to provide a switch between the cathode of diode 327 and this input of the comparator. Thus, this input of comparator 325 could have been coupled either to the cathode of diode 327, or to the output of the DAC converter. However, the passing from the first operating phase of interface 414 (fixed threshold) to the second operating phase (variable threshold) would then have raised an issue. Indeed, the output of the DAC converter could having ended up being coupled to the cathode of diode 327, which could have caused a degradation of diode 327, or could have been floating, which could have caused untimely switchings of switch 309.

More generally, it could have been devised to connect the output of the DAC converter directly in place of diode 327 and providing to control the DAC converter so that it delivers potential Vdac at a value determined by the value of the high threshold having potential Valim compared therewith. However, circuit 331 being preferably powered from the potential available on terminal 3331, it would have been impossible to control the DAC converter during the first phase when switch 309 is off, and thus impossible to implement the comparison of potential Valim with the fixed high threshold. Switch 309 would then have remained off, and the DAC converter would have remained with no electric power supply.

Although the case of an interface 414 where the power negotiation function is implemented by circuit 331 has been described hereabove, it may be provided for the interface to comprise another circuit configured to implement such a function. This other circuit and circuit 331 are then preferably coupled or connected to each other so that circuit 331 obtains information representative of the negotiated set point value of potential Valim, and controls the DAC converter and switch 329 accordingly.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereabove.

The invention claimed is:

1. A power supply interface, comprising:
a first switch coupling an input terminal of the power supply interface to an output terminal of the power supply interface to thereby couple an input voltage to the output terminal of the power supply interface;
a voltage dividing bridge coupling the input terminal to a reference node configured to receive a reference potential, wherein the reference potential is a ground potential;
a comparator having a first input connected to a first node of the dividing bridge and having a second input configured to receive a constant potential, wherein the comparator is configured to generate an output signal that controls the first switch;
a digital-to-analog converter;
a second switch coupling an analog signal output of the digital-to-analog converter to a second node of the dividing bridge; and a first circuit configured to control the second switch and provide a digital value to an input of the digital-to-analog converter.

2. The power supply interface of claim 1, wherein the dividing bridge comprises a first resistor coupling the input terminal to the first node, a second resistor coupling the first node to the second node, and a third resistor coupling the second node to the reference node.

3. The power supply interface of claim 1, wherein the input terminal is configured to receive a first potential, and wherein the output terminal is configured to provide a second potential.

4. The power supply interface of claim 3, configured to receive the first potential of a power source and configured to deliver the second potential to a load.

5. The power supply interface of claim 3, wherein the first circuit is further configured to negotiate a set point value of the first potential and to generate the digital value input to the digital-to-analog converter according to the negotiated set point value.

6. The power supply interface of claim 5, wherein the first circuit is configured to control a turning on of the second switch after the negotiation of said set point value.

7. The power supply interface of claim 1, further comprising a second circuit configured to deliver a signal for controlling the first switch from the output signal of the comparator.

8. The power supply interface of claim 1, further comprising a third circuit having a first terminal coupled to the input terminal through the first switch and having a second terminal coupled to the output terminal, wherein the third circuit is configured to deliver a potential of the first terminal to the second terminal in a first operating mode or a third potential in a second operating mode.

9. The power supply interface of claim 8, wherein the first circuit is configured to select an operating mode among the first and second operating modes.

10. The power supply interface of claim 8, wherein the third circuit comprises a power converter configured to deliver the third potential from the potential of the first terminal.

11. The power supply interface of claim 1, wherein the first switch is a MOS transistor.

12. The power supply interface of claim 1, wherein the second switch is configured to be off in the absence of a control of the first circuit.

13. The power supply interface of claim 1, wherein the second switch is a normally off MOS transistor.

14. The power supply interface of claim 1, wherein the first circuit comprises a microcontroller.

15. A method of powering a load from a power source, comprising the steps of:
  receiving a potential from the power source;
  comparing the received potential to a threshold;
  turning on a first switch to physically and directly electrically connect the received potential to the load if the received potential is lower than the threshold; and
  negotiating, with the source, a set point value of the potential;
  wherein the threshold is fixed in a first operating mode prior to the step of negotiating; and
  wherein the threshold is determined by the negotiated set point value in a second operating mode after the step of negotiating.

16. A power supply interface, comprising:
  a voltage dividing bridge coupled between a first potential and ground, the voltage dividing bridge including a first intermediate node at which a second potential is produced and a second intermediate node at which a third potential is present;
  a comparator having a first input coupled to receive a divider output voltage from the first intermediate node and a second input coupled to receive a fixed voltage;
  a first switch selectively coupling the first potential to an output terminal in response to a first control signal output by the comparator;
  a digital-to-analog converter configured to generate a control voltage in response to a digital value; and
  a second switch selectively coupling the control voltage to the second intermediate node to thereby control the third potential.

17. The power supply interface of claim 16, further comprising a control circuit configured to control the second switch to not couple the control voltage to the second intermediate node in a first operating mode and to control the second switch to couple the control voltage to the second intermediate node in a second operating mode.

18. The power supply interface of claim 17, wherein the control circuit is further configured to negotiate a set point value of the potential in the first operating mode and switch to the second operating mode when the negotiation is completed.

19. The power supply interface of claim 18, wherein the digital value is set in response to the negotiated set point value.

* * * * *